(12) United States Patent
Bauer et al.

(10) Patent No.: US 10,208,218 B2
(45) Date of Patent: Feb. 19, 2019

(54) METHOD FOR INK JETTING OPAQUE INK COMPOSITION

(71) Applicant: Eastman Kodak Company, Rochester, NY (US)

(72) Inventors: Charles Leo Bauer, Webster, NY (US); Tamara K. Jones, Rochester, NY (US); Grace Ann Bennett, Scottsville, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 216 days.

(21) Appl. No.: 15/218,156

(22) Filed: Jul. 25, 2016

(65) Prior Publication Data

US 2017/0145234 A1    May 25, 2017

Related U.S. Application Data

(60) Provisional application No. 62/259,234, filed on Nov. 24, 2015.

(51) Int. Cl.

| | |
|---|---|
| *C09D 11/322* | (2014.01) |
| *C09D 11/38* | (2014.01) |
| *C09D 11/40* | (2014.01) |
| *C09D 11/033* | (2014.01) |
| *B41J 2/01* | (2006.01) |
| *C08F 224/00* | (2006.01) |
| *C09D 135/02* | (2006.01) |
| *C09D 17/00* | (2006.01) |
| *C09D 11/037* | (2014.01) |
| *C09D 11/03* | (2014.01) |
| *C08J 3/05* | (2006.01) |
| *C09D 11/107* | (2014.01) |
| *B41J 2/21* | (2006.01) |

(52) U.S. Cl.
CPC .............. *C09D 11/322* (2013.01); *B41J 2/01* (2013.01); *B41J 2/2107* (2013.01); *C08F 224/00* (2013.01); *C08J 3/05* (2013.01); *C09D 11/03* (2013.01); *C09D 11/033* (2013.01); *C09D 11/037* (2013.01); *C09D 11/107* (2013.01); *C09D 11/38* (2013.01); *C09D 11/40* (2013.01); *C09D 17/001* (2013.01); *C09D 17/008* (2013.01); *C09D 135/02* (2013.01); *B41J 2/2117* (2013.01); *C08F 2800/10* (2013.01); *C08J 2337/00* (2013.01)

(58) Field of Classification Search
CPC .......... B41J 2/2107; B41J 2/01; B41J 2/2117; C09D 11/322; C09D 11/38; C09D 135/02; C09D 11/033; C09D 11/107; C09D 17/008; C09D 11/03; C09D 11/40; C09D 17/001; C09D 11/037; C08F 224/00; C08F 2800/10; C08J 3/05; C08J 2237/00

See application file for complete search history.

(56) References Cited

U.S. PATENT DOCUMENTS

| | | |
|---|---|---|
| 7,022,861 B1 | 4/2006 | McElhanon et al. |
| 7,351,837 B1 | 4/2008 | McElhanon et al. |
| 7,378,533 B1 | 5/2008 | McElhanon et al. |
| 7,592,378 B2 | 9/2009 | Lin et al. |
| 7,595,349 B1 | 9/2009 | McElhanon et al. |
| 7,622,596 B1 | 11/2009 | McElhanon et al. |
| 7,850,774 B2 | 12/2010 | Oriakhi |
| 8,283,385 B2 | 10/2012 | Jessop |
| 8,455,570 B2 | 6/2013 | Lindstrom et al. |
| 8,697,773 B2 | 4/2014 | Okuda et al. |
| 8,991,986 B2 | 3/2015 | Sowinski et al. |
| 2004/0242726 A1 * | 12/2004 | Waki .................. C09D 11/322 523/160 |
| 2008/0197084 A1 | 8/2008 | Jessop |
| 2011/0124745 A1 | 5/2011 | Jessop et al. |
| 2013/0087072 A1 | 4/2013 | Jessop |
| 2014/0123874 A1 | 5/2014 | Kabalnov et al. |
| 2014/0288208 A1 | 9/2014 | Sasada et al. |
| 2014/0292899 A1 | 10/2014 | Kagata et al. |
| 2014/0292902 A1 | 10/2014 | Kagata et al. |
| 2014/0292951 A1 | 10/2014 | Ferrar et al. |

FOREIGN PATENT DOCUMENTS

WO    WO 2007/105806    9/2007

* cited by examiner

*Primary Examiner* — Sharon A Polk
(74) *Attorney, Agent, or Firm* — J. Lanny Tucker

(57) ABSTRACT

A method of inkjet printing includes ink jetting an aqueous inkjet ink composition to form a white printed image on a substrate. The aqueous inkjet ink composition comprises particles of titanium dioxide that are present in an amount of at least 4 to 15 weight % and the particles have a $95^{th}$ percentile particle size of less than 200 nm and a $50^{th}$ percentile particle size of less than 130 nm. The titanium dioxide particles are dispersed within the aqueous inkjet ink composition using a dispersing polymer that is a styrene-(meth)acrylic acid polymer, styrene-maleic anhydride polymer, or styrene-maleic acid polymer and the weight ratio of the titanium dioxide particles to the dispersing polymer is from 19:1 to and including 2:1.

14 Claims, No Drawings

METHOD FOR INK JETTING OPAQUE INK COMPOSITION

CROSS-REFERENCE TO RELATED APPLICATIONS

This application claims the benefit of U.S. Provisional Patent Application No. 62/259,234, filed Nov. 24, 2015, which is incorporated herein by reference in its entirety.

Reference is made of the following copending and commonly assigned patent applications, the disclosures of all of which are incorporated herein by reference:

U.S. Ser. No. 15/218,132, filed on Jul. 25, 2016, by Bauer and Jones and entitled "Providing Opaque Ink Jetted Image" that has the benefit of priority of U.S. Ser. No. 62/259,222 filed Nov. 24, 2015;

U.S. Ser. No. 15/218,144, filed on Jul. 25, 2016, by Bauer, Bennett, and Jones and entitled "Pigment Dispersions and Inkjet Ink Compositions" that has the benefit of priority of U.S. Ser. No. 62/259,226 filed Nov. 24, 2015; and U.S. Ser. No. 15/218,172, filed on Jul. 25, 2016, by Bauer, Bennett, and Jones and entitled "Aqueous Colorant Dispersions and Inkjet Compositions" that has the benefit of priority of U.S. Ser. No. 62/259,238 filed Nov. 24, 2015.

FIELD OF THE INVENTION

This invention relates to aqueous dispersions including colorant particles such as titanium dioxide particles, aqueous inkjet ink compositions, and methods for forming pigmented images such as opaque (white) images on a substrate. The aqueous dispersions and aqueous inkjet ink compositions can include unique dispersing polymers especially when titanium dioxide particles are used as the pigment colorant.

BACKGROUND OF THE INVENTION

Inkjet printing systems are generally of two types: drop on demand (DOD) printing systems and continuous inkjet (CIJ) printing systems. Inkjet printing is a standard method for printing a colored or pigmented image onto a substrate wherein a stream of ink droplets containing pigment particles are directed from a printing device to a surface of a suitable receiver element or substrate. The direction of the stream of droplets is controlled electronically so as to cause printing the drops in a desired image or information on the substrate surface without requiring contact between the printing device and the surface to which the ink is applied. Objects comprising substrates to which inkjet printing is well suited include but are not limited to, containers for consumer products, currency, draft checks, envelopes, letterhead, documents of various types, identification cards, lottery tickets, bank cards, identification strips, labels, brochures, signage, and other well-known materials.

Drop-on-demand printing systems are widely used in home or consumer inkjet printers and slower consumer printers, both of which have been available for several decades. As the name implies, this type of inkjet printing uses a print head that ejects drops of ink only when signaled to do so by a digital controller.

CIJ printing systems generally comprise two main components, a fluid system (including an ink reservoir) and one or more print heads. Ink can be pumped through a supply line from the ink reservoir to a manifold that distributes the ink to a plurality of orifices, typically arranged in linear array(s), under sufficient pressure to cause ink streams to issue from the orifices of the print head(s). Stimulations can be applied to the print head(s) to cause those ink streams to form streams of uniformly sized and spaced drops that are deflected in a suitable manner into printing or non-printing paths. Non-printing drops can be returned to the ink reservoir using a drop catcher and a return line. Thus, in contrast to DOD printing systems, CIJ printing systems involve the use of a continuous stream of ink drops that are separated to discriminate between spaced printing drops and non-printing drops. For example, this discrimination can be accomplished by air deflection or by electrostatically charging the drops and passing the charged drops through an electric field. Charged drops are deflected by a charge field and can be caught and returned to the reservoir of ink. Uncharged drops are printed onto a substrate or receiver material.

In general, pigment-based inks can comprise a wide variety of organic or inorganic pigments that can be chosen depending upon the specific application and performance requirements for the printing system and desired printing results (for example, desired hue). For example, such organic or inorganic pigments can include but are not limited to, titanium dioxide or other white pigments, carbon black or other black pigments, red pigments, green pigments, blue pigments, orange pigments, violet pigments, magenta pigments, yellow pigments, and cyan pigments. Iridescent and metallic pigments can also be used for special optical effects.

White inks can be prepared using high refractive index particles of inorganic materials such as metal oxides including titanium dioxide. Such particles are most efficient at scattering actinic light with particle sizes of from 200 nm to 1000 nm. However, because of their density, such particles in this size range or larger do not form stable aqueous dispersions and will readily settle out even when a typical dispersant is included in the aqueous dispersions or formulations. Aqueous white inks are described in U.S. Patent Application Publication 2014/0292902 (Kagata et al.) in which metal oxides are mixed with binder resins such as polyester resins, fluorene resins, or styrene-acrylic resins, organic solvents (polyols or pyrrolidones), and surfactants. The metal oxide particles are defined by using a specified relationship of a structural factor, porosity, particle diameter, and specific gravity with the average particle size being greater than 150 nm and less than 10,000 nm, and more preferably in the range of from 300 nm to 600 nm.

Other white inkjet ink compositions are described in U.S. Pat. No. 7,850,774 (Oriakhi) in which the white pigment dispersions display a bimodal distribution wherein at least 5 weight % of the particles have an average size equal to or greater than 100 nm and at least 25 weight % of the particles have an average size of equal to or less than 50 nm.

Still another aqueous inkjet ink composition is described in U.S. Patent Application Publication 2014/0288208 (Sasada et al.), which composition comprises particles of titanium dioxide having an average primary particle diameter of 200 nm or more, a water-soluble resin, and self-dispersing resin particles having an average particle diameter of 40 nm or less.

U.S. Pat. No. Application Publication 2014/0123874 (Kabalnov et al.) describes a white inkjet ink having high index refraction index particles having a diameter of less than 100 nm and low refraction index particles such as emulsion particles having a diameter of greater than 100 nm.

U.S. Pat. No. 7,592,378 (Lin et al.) describes aqueous titanium dioxide slurries for inkjet processes in which the titanium dioxide pigment is dispersed using a combination of a graft copolymer and a block copolymer. The titanium dioxide particles are considered to have a more preferred particle size of from 100 nm to 500 nm.

A mixture of a styrene acrylic resin and a urethane resin is used as a fixing resin in white compositions according to U.S. Pat. No. 8,697,773 (Okuda et al.). In these compositions, the more preferred particle size is 200 nm to 400 nm.

To obtain stable dispersions of inorganic pigments such as titanium dioxide in the presence of dispersants, the pigment particle size should be below 200 nm, and even less than 100 nm. However, at a particle size that is less than ½ the wavelength of actinic light, such inorganic pigment particles do not effectively scatter actinic light to create a dry "white" coating of desired opacity.

Thus, there is a need to create stable (well dispersed) aqueous dispersions and aqueous inkjet ink compositions that comprise titanium dioxide or other white pigments or even other colorants wherein the particle size is generally below 200 nm for effective stability in the aqueous dispersions and inks and for effective actinic light scattering when the particles aggregate into larger light scattering centers upon drying on a surface, thereby providing desired opaque images.

SUMMARY OF THE INVENTION

The present invention provides a method of inkjet printing, comprising:
providing a substrate, and
ink jetting an aqueous inkjet ink composition to form a white printed image on the substrate,
wherein the aqueous inkjet ink composition comprises particles of titanium dioxide that are present in an amount of at least 4 weight % and up to and including 15 weight %, and the titanium dioxide particles have a $95^{th}$ percentile particle size of less than 200 nm and a $50^{th}$ percentile particle size of less than 130 nm, and
the titanium dioxide particles are dispersed within the aqueous inkjet ink composition with a dispersing polymer that is a styrene-(meth)acrylic acid polymer, styrene-maleic anhydride polymer, or styrene-maleic acid polymer, wherein such dispersing polymer comprises at least 25 mol % of styrene recurring units and at least 20 mol % of recurring units derived from (meth)acrylic acid, maleic anhydride or maleic acid, respectively; and the weight ratio of the titanium dioxide particles to the dispersing polymer is from 19:1 to and including 2:1.

In addition, the present invention provides a method of inkjet printing, comprising:
providing a substrate,
ink jetting an aqueous inkjet ink composition from a main fluid supply as a continuous stream that is broken into both printing drops and non-printing drops, forming a white printed image on the substrate with the printing drops, and
collecting and returning the non-printing drops to the main fluid supply,
wherein:
the aqueous inkjet ink composition comprises particles of titanium dioxide that are present in an amount of at least 4 weight % and up to and including 15 weight %, and the titanium dioxide particles have a $95^{th}$ percentile particle size of less than 200 nm and a $50^{th}$ percentile particle size of less than 130 nm, and
the titanium dioxide particles are dispersed within the aqueous inkjet ink composition with a dispersing polymer that is a styrene-(meth)acrylic acid polymer, styrene-maleic anhydride polymer, or styrene-maleic acid polymer, wherein such dispersing polymer comprises at least 25 mol % of styrene recurring units and at least 20 mol % of recurring units derived from (meth)acrylic acid, maleic anhydride or maleic acid, respectively; and the weight ratio of the titanium dioxide particles to the dispersing polymer is from 19:1 to and including 2:1.

The present invention provides improved aqueous dispersions and aqueous inkjet ink compositions that can be used to provide dry opaque ("white") or other dry colored pigment images on a surface (including specially treated substrates) using various inkjet processes including continuous inkjet processes. The particle size of the pigment colorants such as titanium dioxide particles is carefully controlled for desired dispersibility, ink jetting properties, and then successful agglomeration of ink jetted particles on a substrate to exhibit successful actinic light scattering (high refractive index) especially when opaque images are desired. In some embodiments, titanium dioxide particles or other pigment colorant particles are dispersed and ink jetted using dispersing polymers as described below.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described in the discussion of any particular embodiment.

Definitions

As used herein to define various components of the various aqueous dispersions or aqueous inkjet ink compositions (whether containing titanium dioxide or other pigments), unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

As used herein, the parameter "acid number" (also known as acid value) is defined as the milligrams (mg) of potassium hydroxide required to neutralize 1 g of the described acidic polymer.

Unless otherwise indicated herein, the term "white" as applied to dry images on a substrate is described by the image "whiteness index" that can be determined using the known standard ASTM E313-10.

Unless otherwise specified, the term "pigment colorant" includes any an aqueous-insoluble organic or inorganic material that can provide a desired color, hue, or other optical effect for example in an ink jetted image. Such pigment colorants include metal oxides such as titanium dioxide that can be used to provide aqueous dispersions and aqueous inkjet ink compositions. For such aqueous dispersions and aqueous inkjet ink compositions when dried on a substrate, the opacity and hiding power are dependent on the ability of such particles to scatter actinic light across the visible spectrum (generally wavelengths of at least 400 nm and up to and including 750 nm). The scattering intensity of actinic light is known to be a strong function of the refractive index difference between the dried particles and the material surrounding the particles, and the particle size of the pigment colorant particles. As this refractive index difference is increased, the greater the actinic light scattering effect.

As used herein, the parameter "opacity" can be measured using an X-rite densitometer. The density of an applied image according to this invention can be measured over the white and black calibration patches provided with the densitometer. The % opacity was calculated according to the following formula:

$$\% \text{ Opacity} = 100 * \left(1 - \frac{D_{ink,black} - D_{ink,white}}{D_{support,black} - D_{support,white}}\right)$$

wherein:
$D_{ink,black}$=density of the ink sample applied over the black patch;
$D_{ink,white}$=density of the ink sample applied over the white patch;
$D_{support,black}$=density of the support applied over the black patch; and
$D_{support,white}$=density of the support applied over the white patch.

The term "aqueous" in aqueous inkjet ink compositions as used in the present invention means that the water content is greater than 50 weight % based on the total aqueous inkjet ink composition weight. Water is the predominant solvent (that is, it is more than 50 weight % of all solvents).

Particle size for the various pigment colorants including titanium dioxide refers to the approximate diameter of a generally spherical pigment particle or to the approximate largest characteristic dimension of a non-spherical particle. The $95^{th}$ percentile particle size refers to the classified particle size distribution such that 95% of the volume of pigment colorant particles is provided by particles having diameters smaller than the indicated diameter. Similarly, the $50^{th}$ percentile particle size refers to the classified particle size distribution such that 50% of the volume of pigment colorant particles is provided by particles having diameters smaller than the indicated diameter. The $20^{th}$ percentile particle size refers to the classified particle size distribution such that 20% of the volume of pigment colorant particles is provided by particles having diameters smaller than the indicated diameter. Such particle size (or particle volume) evaluation can be made using a Nanotrac 150 ultrafine particle analyzer (Microtrac).

Titanium dioxide used in some embodiments of this invention is also known as titania or titanium dioxide (IV) and can be any of a rutile, anatase crystalline, or brookite type, or it can be a mixture of two or more of such types. Suitable commercial titanium dioxides are described below in the Examples.

The pigment colorants used in the various embodiments of the present invention are generally not self-dispersing meaning that the pigment colorant particles are not purposely surface treated to provide dispersibility in aqueous formulations, but some surface treatment can be present as provided by a commercial manufacturer. Thus, such pigment colorants require the presence of one or more pigment dispersants such as dispersing polymers described below to keep them suspended in an aqueous medium.

The terms "water-soluble" and "aqueous-soluble" mean that 2% by weight or more of a described material can be dissolved in distilled water at 25° C., or particularly at least 5% by weight of such material can be so dissolved and the resulting solution is generally homogeneous and visually clear.

For clarification of definitions for any terms relating to polymers, reference should be made to "Glossary of Basic Terms in Polymer Science" as published by the International Union of Pure and Applied Chemistry ("IUPAC"), *Pure AppL Chem.* 68, 2287-2311 (1996). However, any definition explicitly set forth herein should be regarded as controlling. Polymers can be prepared from ethylenically unsaturated polymerizable monomers using free radical polymerization or acid catalyzed polymerization processes, or from appropriate condensation reactants (for example diols and diisocyanates) using known condensation polymerization processes.

Unless otherwise indicated, the terms "polymer" and "polymeric" refer to homopolymers and copolymers, each having a weight average molecular weight ($M_w$) of at least 5,000 as measured using gel permeation chromatography "(GPC).

The term "copolymer" refers to polymers that are derived from two or more different monomers, in random order or a predetermined order (for example, block or alternating order) along the polymer backbone. That is, each copolymer comprises at least two recurring units having different chemical structures.

The term "backbone" refers to the chain of atoms in a polymer to which a plurality of pendant groups can be attached. An example of such a backbone is an "all carbon" backbone obtained from the polymerization of one or more ethylenically unsaturated polymerizable monomers. However, other backbones can include heteroatoms wherein the polymer is formed by a condensation reaction or some other means.

Many embodiments of the aqueous inkjet ink compositions used in the present invention, especially those used in continuous inkjet processes and inkjet printers generally have a viscosity of less than 3 centipose (less than 0.003 Pa-sec) at 25° C., or more likely less than 2 centipoise (less than 0.002 Pa-sec), or even 1 centipoise or less (0.001 Pa-sec or less), at 25° C., with a minimum viscosity being at least 0.8 centipoise (at least 0.0008 Pa-sec) at the noted temperature. Viscosity can be measured at the noted temperature using a standard viscometer.

Aqueous Dispersions and Aqueous Inkjet Ink Compositions

The aqueous dispersions and aqueous inkjet ink compositions according to the present invention are characterized as containing particles of one or more pigment colorants that are present to provide a desired coloration upon application to a suitable substrate by ink jetting processes followed by drying or curing to remove the water and any co-solvent(s). In most embodiments, the pigment colorants are not aqueous-dispersible and thus are prepared in aqueous dispersions using one or more dispersing polymer(s), as described below. The pigment colorants can be either organic or inorganic in chemical nature.

In some embodiments, particles of titanium dioxide are used as the pigment colorant and are present in the aqueous inkjet ink compositions in a sufficient amount to provide an ink jetted image having an opacity of at least 30%, or even at least 40%, for example in an amount of at least 2 weight % and up to and including 25 weight %, or more typically of at least 4 weight % and up to and including 15 weight %, all based on the total weight of the aqueous inkjet ink composition (including the water weight). The titanium dioxide particles can be present with one or more other type of pigment colorant particles (such as those described below), or even with suitable dye colorants, but in most embodiments, the titanium dioxide particles are the only pigment colorant particles present in the aqueous dispersions and aqueous inkjet ink compositions in the noted amounts. In most embodiments, the titanium dioxide particles, or other pigment colorant particles described below used in the aqueous dispersions and aqueous inkjet ink compositions, have a $95^{th}$ percentile particle size of less than 200 nm, or even less than 150 nm. Moreover, they generally also have a $50^{th}$ percentile particle size of less than 130 nm, or typically of less than 100 nm. The titanium dioxide or other pigment colorant pigments generally have a minimum or $20^{th}$ percentile particle size of at least 50 nm, or even at least 75 nm.

Other pigment colorants can be used to provide opaque ink jetted images alone or in addition to titanium dioxide (titania) as long as they have the desired particle size characteristics (described above), are present in the described amounts, to provide the desired opacity of at least 30% as defined above. For example, the aqueous dispersions and aqueous inkjet ink compositions can comprise particles of inorganic pigments such as particles of zinc oxide, salts and esters of titanic acid, zirconium oxide (zirconia), aluminum phosphate, aluminum oxide (alumina), barium sulfate, calcium carbonate, magnesium oxide, silicon dioxide (silica), and similar materials, as well as combinations of such materials. Hollow sphere or other porous polymeric particles can also be used in combination with these inorganic pigments.

Other pigment colorants can also be used in aqueous dispersions and aqueous inkjet ink compositions, singly or in mixtures, in place of titanium dioxide particles. Such pigment colorants can be used to provide ink jetted images of various hues or colors other than the noted opaque ("white") images. For example, useful aqueous dispersions and aqueous color inkjet ink compositions can be designed to provide cyan, magenta, yellow, or black images, all having the appropriate single or mixture of pigment colorants and dispersing polymers to provide the desired image hue. Other useful aqueous dispersions and aqueous color inkjet ink compositions can comprise pigment colorants to provide orange, red, green, brown, purple, or blue colored ink jetted images or any hue using combinations of such colors, and thus contain one or more suitable pigment colorants to provide the desired ink jetted image hue.

A wide variety of organic and inorganic pigment colorants can be used individually or in combination. For example, a carbon black pigment can be combined with a colored pigment such as a cyan copper phthalocyanine or a magenta quinacridine pigment. Useful pigment colorants are described for example in U.S. Pat. No. 5,026,427 (Mitchell et al.), U.S. Pat. No. 5,141,556 (Matrick), U.S. Pat. No. 5,160,370 (Suga et al.), and U.S. Pat. No. 5,169,436 (Matrick), the disclosures of all of which are incorporated herein by reference.

Useful pigment colorants include but are not limited to, azo pigments, monoazo pigments, disazo pigments, azo pigment lakes, β-naphthol pigments, naphthol AS pigments, benzimidazolone pigments, disazo condensation pigments, metal complex pigments, isoindolinone and isoindoline pigments, quinacridone pigments, polycyclic pigments, phthalocyanine pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, iron oxide, and carbon blacks. Specific useful pigment colorants are also described in Col. 10 (lines 66) to Col. 11 (line 40) of U.S. Pat. No. 8,455,570 (Lindstrom et al.), the disclosure of which is incorporated herein by reference.

The amount of one or more pigment colorants (for example, titanium dioxide) in the aqueous dispersions can be any suitable amount that is typically used to make such compositions, for example at least 5 weight % and up to and including 80 weight %, based on the total weight of the aqueous dispersion (including the aqueous medium). The amount of the pigment colorants in the aqueous inkjet ink compositions is generally much less, such as at least 2 weight % and up to and including 25 weight %, or more typically at least 4 weight % and up to and including 15 weight %, all based on the total weight of the aqueous inkjet ink composition (including the aqueous medium).

The aqueous inkjet ink compositions described herein generally also comprise one or more humectants that are generally water soluble or water miscible organic solvents (sometimes known as "co-solvents"). For example, any water-soluble humectant or co-solvent known in the inkjet art that is compatible with the other components of the invention can be used. While an individual humectant or co-solvent can be employed, mixtures of two or more humectants or co-solvents, each of which imparts a useful property, can be used. Representative humectants and co-solvents useful in the aqueous inkjet ink compositions include but are not limited to the following compounds:

(1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol;

(2) polyhydric alcohols (polyols), such as ethylene glycol, diethylene glycol, triethylene glycol, tetraethylene glycol, propylene glycol, dipropyleneglycol, the polyethylene glycols with average molecular weights of at least 200 Daltons to and including 5000 Daltons, the polypropylene glycols with average molecular weights of at least 200 Daltons to and including 5000 Daltons, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-heptanediol, 2-ethyl-1,3-hexane diol, 2,2,4-trimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides, sugar alcohols, glycol, and thioglycol;

(3) polyoxygenated polyols and their derivatives such as diglycerol, polyglycerols, glycerol ethoxides, glycerol propoxides, glyceryths, alkylated and acetylated glyceryths, pentaerythritol, pentaerythritol ethoxides, and pentaerythritol propoxides and their alkylated and acetylated derivatives;

(4) nitrogen-containing compounds such as urea, 2-pyrrolidone, N-methyl-2-pyrrolidone, imidazolidinone, N-hydroxyethyl acetamide, N-hydroxyethyl-2-pyrrolidinone, 1-(hydroxyethyl)-1,3-imidazolidinone, 1,3-dimethyl-2-imidazolidinone, and 1,3-dihydroxy-2-imidazolidinone;

(5) sulfur-containing compounds such as 2,2'-thiodiethanol, dimethyl sulfoxide and tetramethylene sulfone; and (6) water soluble N-oxides such as 4-methylmorpholine-N-oxides.

Of these compounds, glycerol, ethylene glycol, and 2-pyrrolidinone (or mixtures thereof) are particularly useful. Useful polyhydric alcohol derivatives of glycerol include the glycerol ethoxides, glycerol propoxides, and glyceryths. Useful humectants generally have melting points below the typical operating temperature of the intended printer system to avoid the formation of crystalline deposits on the print head or in the maintenance system. Practically, this means that the useful humectants have melting points below 30° C. or even below 20° C.

The one or more humectants (or co-solvents) can be present in an amount of at least 1 weight %, or at least 5 weight % and up to and including 10 weight %, or up to and including 20 weight %, all based on the total weight of the aqueous inkjet ink composition.

The particles of pigment colorants (such as particles of titanium dioxide) are dispersed or kept suspended within the aqueous dispersions and aqueous inkjet compositions described herein using one or more dispersing polymers as defined below.

The pigment colorants can be subjected to a milling or dispersing process to break up pigment particles into primary particles of the desired size wherein a primary particle is defined as the smallest identifiable subdivision in a particulate system.

For example, milling can be carried out using any type of grinding mill such as a media mill, ball mill, a two-roller mill, a three-roller mill, a bead mill, or an air-jet mill, or by using an attritor or liquid interaction chamber. During this milling process, the noted pigment colorants are generally suspended in a suitable aqueous medium that is typically the same or similar to the medium used to prepare the aqueous inkjet ink composition. Inert milling medium can be present in the milling step in order to facilitate breaking up the pigment colorant into primary particles. Inert milling media can include such as glass balls, polymeric beads (such as crosslinked polystyrene beads), ceramics, metals, and plastics as described for example in U.S. Pat. No. 5,891,231 (Gnerlich et al.).

Milling media are generally removed from the aqueous dispersion in a suitable manner before formulating the aqueous dispersion into an aqueous inkjet ink composition.

One or more dispersing polymers are generally used in the milling process in order to maintain primary particle stability and to prevent settling or agglomeration in the aqueous medium. Dispersing polymers useful for this purpose are described below. Such materials can be added prior to or during the milling step.

Pigment colorant particles (such as titanium dioxide particles) can be present in aqueous inkjet ink compositions in an amount of at least 2 weight % and up to and including 25 weight %; a humectant can be present that has a molecular weight of less than 1,000; and the weight ratio of the pigment colorant particles to the dispersing polymer can be from 19:1 to and including 2:1, from 13:1 to and including 4:1, or from 9:1 to and including 5:1 (such weight ratios also apply to the aqueous dispersions). For example, the pigment colorant particles can be titanium dioxide particles and the aqueous inkjet ink composition is capable of providing a dry image having an opacity of at least 30% as noted above.

The presence of the dispersing polymer keeps the pigment colorant particles (such as titanium dioxide particles) suitably dispersed so that they have a $95^{th}$ percentile particle size of less than 200 nm and a $50^{th}$ percentile particle size of less than 130 nm.

The aqueous dispersions and aqueous inkjet ink compositions comprise one or more dispersing polymers that are polymers comprising recurring units derived from ethylenically unsaturated polymerizable monomers ("monomers") having a pendant group that is an carbocyclic aromatic group including but not limited to, a substituted or unsubstituted phenyl group, a substituted or substituted benzyl group, a substituted or unsubstituted phenoxy group, or a substituted or unsubstituted phenethyl group. Examples of such monomers include but are not limited to substituted or substituted styrene monomers, substituted or unsubstituted phenoxyethyl (meth)acrylate, benzyl (meth)acrylate, phenyl (meth)acrylate, and phenethyl (meth)acrylate. Particularly useful monomers of this type are substituted or unsubstituted styrene monomers.

The dispersing polymers are particularly designed by reacting a substituted or unsubstituted styrene monomer to provide at least 25 mol % of recurring units from such monomers, as well as (meth)acrylic acid, maleic anhydride, or maleic acid, or combinations thereof to provide at least 20 mol % of recurring units from such acidic monomers. These amounts are based on the total molar amount of recurring units in the dispersing polymer.

Such dispersing polymers also comprise recurring units derived from methacrylic acid, and optionally additional recurring units derived from other ethylenically unsaturated polymerizable monomers. The various monomers used to prepare these dispersing polymers can be obtained from various commercial sources or prepared using known reactants and procedures.

In such copolymers, the recurring units derived from a monomer having a pendant carbocyclic aromatic group are present in an amount of at least 20 mol %, or even at least 40 mol %, and up to and including 70 mol %, or up to and including 80 mol %, of the total recurring units in the copolymer. It would be understood that the theoretical amount of recurring units can vary from the actual amount of recurring units.

Representative dispersing polymers of this type are described below in the Examples.

The described dispersing polymers can have a molecular weight ($M_w$) as measured by GPC (using polystyrene standards) of at least 5,000 Daltons or at least 6,000 Daltons, and up to and including 100,000 Daltons, or up to and including 50,000 Daltons.

Moreover, each of the noted dispersing polymers generally has an acid value of at least 100 and up to and including 500 or at least 150 and up to and including 300.

The aqueous inkjet ink compositions described herein generally comprise a suitable aqueous medium to "carry" the particles of one or more pigment colorants, one or more dispersing polymers, one or more humectants, and any other components during formulation and use. In general, the aqueous medium is primarily water, meaning that water comprises at least 50 weight %, or even at least 90 weight %, of all of the solvents in the aqueous inkjet ink composition. In addition, the aqueous medium generally comprises at least 70 weight % or at least 80 weight % of the total weight of the aqueous inkjet ink composition. What is not water in the aqueous medium can be one or more water-soluble or water-miscible organic solvents such as a glycol, amide, ether, urea, ester, or alcohol known in the art for this purpose. In most embodiments, the aqueous medium is solely water.

The pH of each aqueous inkjet ink composition is generally at least 7 and up to and including 11 or more likely at least 8 and up to and including 10. The pH can be obtained and adjusted by use of suitable acids or bases as is known in the art, such as an organic amine in a suitable amount. Buffers can be included to maintain the desired pH and such materials would be readily apparent to one skilled in the art, including those described in Cols. 17-19 of U.S. Pat. No. 8,455,570 (noted above).

If desirable, one or more modified polysiloxanes can be present in the aqueous inkjet ink compositions. Examples of such materials are ethoxylated or propoxylated silicone-based "surfactants" that can be obtained commercially under the trademarks SILWET® (CL Witco), and BYK® (Byk Chemie) such as BYK® 348 and 381, as well as Dow Corning DC67, DC57, DC28, DC500W, and DC51. One or more modified polysiloxanes can be present in a cumulative amount of up to and including 1 weight %, or at least 2 weight % and up to and including 10 weight %, based on the total weight of the aqueous inkjet ink composition.

Other additives that can be present in the aqueous inkjet ink compositions, in amounts that would be readily apparent to one skilled in the art, include but are not limited to, polymer binders, thickeners, conductivity-enhancing agents, drying agents, waterfast agents, viscosity modifiers, pH buffers, antifoamants, wetting agents, corrosion inhibitors, biocides (such as Kordek and Proxel), fungicides, defoamers (such as SURFYNOL® DF110L, PC, MD-20, and DF-70 defoamers), non-silicone surfactants (anionic, cationic, non-ionic, or amphoteric) such as SURFYNOL® (Air Products) surfactants including SURFYNOL" 440 and 465 surfactants, UV radiation absorbers, antioxidants, and light stabilizers available under the trademarks TINUVIN® (Ciba) and IRGANOX® (Ciba), as well as other additives described in Col. 17 (lines 11-36) of U.S. Pat. No. 8,455,570 (Lindstrom et al.). Examples of other useful non-silicone surfactants are provided in [0065]-[4006] of U.S. Patent Application Publication 2008/0207811 (noted above).

For example, in some embodiments of the invention, the aqueous inkjet ink composition can include one or more polyurethanes in a total amount of at least 0.1 weight % and up to and including 8 weight %, of even at least 1 weight % and up to and including 4 weight %, all based on the total weight of the aqueous inkjet ink composition.

Such polyurethanes are generally water-dispersible and can include but are not limited to polycarbonate polyurethanes, polyether polyurethanes, polyester polyurethanes, and polysiloxane polyurethanes, for example as described in U.S. Pat. No. 8,430,492 (Falkner et al.) and U.S. Patent Application Publication 2008/0207811 (Brust et al.), the disclosures of which are incorporated herein by reference.

Ink Sets

The aqueous inkjet ink compositions designed for the present invention can be provided as part of an ink set containing multiple aqueous inkjet ink compositions including an aqueous inkjet ink composition to provide an opaque ink jetted image as well as one or more aqueous inkjet ink compositions that provide a color other than "white." Alternatively, two or more aqueous inkjet ink compositions designed within the scope of the present invention can be combined to form suitable ink sets. Various pigment colorants (including titanium dioxide) can be present in the various aqueous inkjet ink compositions combined in the ink sets. The aqueous inkjet ink compositions in the ink set generally comprise different pigment colorants, and they can comprise the same or different aqueous soluble dispersing polymers.

Such ink sets can therefore include one or more aqueous inkjet ink compositions, and at least one of the aqueous inkjet ink compositions comprises at least one of the dispersing polymers described above and can also include titanium dioxide as the colorant pigment, alone or in combination with another colorant pigment.

Unless otherwise specified above, the pigment colorants can be present in the individual aqueous inkjet ink compositions in an amount of at least 0.1 weight % and up to and including 30 weight %, or more likely of at least 1 weight % and up to and including 15 weight %, or even at least 1 weight % and up to and including 10 weight %, based on the total weight of the individual aqueous inkjet ink composition.

Each of the aqueous inkjet ink compositions included in each ink set can have a desirable pH of at least 7 and up to and including 11, or at least 8 and up to and including 10 using suitable bases and buffer systems.

In addition, each aqueous inkjet ink composition included in an ink set can have suitable viscosity of at least 1 centipose as measured at 25° C. using a suitable viscometer. In some embodiments designed for use in continuous inkjet processes and inkjet printers, the individual aqueous inkjet ink composition has a viscosity of less than 3 centipoise (less than 0.003 Pa-sec) or even less than 2 centipose (less than 0.002 Pa-sec) at 25° C.

Preparation of Aqueous Inkjet Compositions

Each aqueous inkjet ink composition described herein can be prepared by dispersing suitable pigment colorant particles (such as titanium dioxide particles) in water (or aqueous medium) using suitable dispersing polymers as described above, and mixing the resulting aqueous dispersion and other desired materials described above in suitable amounts. Specific details for how aqueous dispersions and aqueous inkjet ink compositions can be prepared are provided below for the Examples.

Methods of Inkjet Printing

The aqueous inkjet ink compositions described above can be used to form a pigmented image on a suitable substrate (described below) for example, using inkjet printing. For example, the resulting inkjet printed image can be formed using any suitable inkjet application means (either DOD or CIJ inkjet printer apparatus) to provide colored or opaque printed areas on the substrate.

For example, an opaque ("white") image can be provided by inkjet printing one or more aqueous inkjet ink compositions containing titanium dioxide particles using thermal or piezoelectric drop-on-demand (DOD) printheads or continuous (CIJ) printheads that utilize electrostatic charging devices and deflector plates or air deflection devices. Printing with each type of printhead and apparatus attached thereto can be optimized using aqueous inkjet ink compositions designed with specific properties, specific pigment colorant particles (such as titanium dioxide particles), and dispersing polymers as described above in order to achieve reliable and accurate ink jetting and to provide the desired opacity in the resulting inkjet printed image.

For example, a method for inkjet printing can comprise:
  providing a substrate as described below, for example, comprising a topmost layer comprising at least 30 weight % of one or more soluble multivalent metal cations and at least 0.05 g/m² of a hydrophilic polymeric binder (as described below), ink jetting an aqueous inkjet ink composition (as described herein) from a main fluid supply as a continuous stream that is broken into both printing drops and non-printing drops, forming a pigmented printed image (such as an opaque "white" printed image having an opacity of at least 30%) on the substrate with the printing drops, and collecting and returning the non-printing drops to the main fluid supply.

In some embodiments of such methods, the aqueous inkjet ink composition used in this particular method comprises particles of titanium dioxide in an amount of at least 4 weight % and up to and including 15 weight %, based on the total weight of the aqueous inkjet ink composition. Such titanium dioxide particles have the $95^{th}$ percentile particle size and $50^{th}$ percentile particle size values described above, and are dispersed within the aqueous inkjet ink composition using a dispersing polymer described above, such as a polymer comprising acidic groups, and the weight ratio of the particles of titanium dioxide to the dispersing polymer is as defined above.

In other embodiments of the present invention, the method of inkjet printing comprises:

providing a suitable substrate (as described below), and ink jetting an aqueous inkjet ink composition as described above to form a printed image on the substrate, wherein the aqueous inkjet ink composition comprises a pigment colorant particles as described above (such as titanium dioxide particles).

For example, in many embodiments, each aqueous inkjet ink compositions provided in an ink set has a dedicated delivery channel to avoid having oppositely charged materials in the multiple inkjet ink compositions interact until they come into reactive association on the intended substrate. The multiple aqueous inkjet ink compositions can be applied (ink jetted) either in the same pass or they can be applied in independent multiple passes.

When the inkjet printing method is carried out using CU apparatus, the method can include:

ink jetting the aqueous inkjet ink composition described above from a main fluid supply as a continuous stream that is broken into both printed spaced drops and non-printing drops; and collecting and returning the non-printing drops to the main fluid supply for use at a later time.

In some of such embodiments, the ink jetting can be carried out using a drop generator mechanism so that the printed spaced drops cover at least 5% and up to and including 90% of a substrate area.

In addition, such an ink jetting method can include:

delivering a first aqueous inkjet ink composition as described above to a first drop generator mechanism, ejecting the first aqueous inkjet ink composition from the first drop generator mechanism as first spaced drops while controlling the first spaced drops to provide a first printed image on the substrate;

delivering a second aqueous inkjet ink composition as described above to a second drop generator mechanism, and ejecting the second aqueous inkjet ink composition from a second drop generator mechanism as second spaced drops while controlling the second spaced drops.

An inkjet printed image can also be formed using a CIJ method, comprising:

delivering a first aqueous inkjet ink composition from a first main fluid supply as a continuous stream that is broken into both first spaced drops and first non-printing drops;

collecting and returning the first non-printing drops to the first main fluid supply;

delivering a second aqueous inkjet ink composition from a second main fluid supply as a continuous stream that is broken into both second spaced drops and second non-printing drops; and collecting and returning the second non-printing drops to the second main fluid supply.

Each aqueous inkjet ink composition used in the inkjet printing methods can be positioned in any one of the printhead ports intended for such use. Each aqueous inkjet ink composition can be positioned on an individual carriage assembly, or all of the aqueous inkjet ink compositions can be positioned on the same carriage assembly.

An inkjet printing method can be carried out to provide a suitable inkjet ink image on a suitable substrate (also known in the art as "receiver" or "receiver element"). Any individual substrate will have what would be understood as a total "printable" area onto which an aqueous inkjet ink composition can be ink jetted using suitable equipment and processes. The method can be used to apply an aqueous inkjet ink composition over a predetermined or areal percentage of the total printable area. Thus, the predetermined or areal percentage of the substrate to be covered by any individual aqueous inkjet ink composition can be as low as 0.5% and up to and including 100%, but more likely at least 10% and up to and including 90%.

Suitable substrates can include but are not limited to, photoglossy receivers or plain paper receivers such as bright white inkjet papers that are commercially available from a number of commercial sources (as described for example, in Col. 13, lines 28-34) of U.S. Pat. No. 8,187,371 (noted above). The photoglossy receivers (also known as swellable media or microporous media) can be manufactured with a coated layer on an underlying paper support and are also useful for providing photographic quality inkjet printed images. Some details of such substrates are provided in Col. 13 (lines 37-51) of U.S. Pat. No. 8,187,371 (noted above). Plain papers can be treated with multivalent salts during or after manufacture as is well known in the art. Other useful substrates are described in U.S. Pat. No. 6,045,917 (Missell et al.), U.S. Pat. No. 5,605,750 (Romano et al.), U.S. Pat. No. 5,723,211 (Romano et al.), and 5,789,070 (Shaw-Klein et al.).

Useful paper substrates include plain bond papers, surface-treated papers, coated or calendared business gloss papers, resin-coated papers, laminated substrates comprising both paper layers and polymeric film layers such as polyester film layers, and heavy stock papers. It is also possible to use fabrics, cardboard, plastic films (such as polyolefins and polyester films), microporous materials, sheet metal, glass, and any other substrate material known in the art. The substrate can be transparent, translucent, or opaque. For the "white" (opaque) aqueous inkjet ink compositions described for the present invention, transparent or translucent polymeric films are particularly useful.

The durability, opacity, and other properties of inkjet printed images provided according to this invention can be improved by using treated substrates that have been pretreated with a composition to enhance the quality of the inkjet printed images. This pretreatment is typically done prior to incorporation of the substrate into the inkjet printing apparatus (such as a continuous inkjet printing apparatus), but in some instances, the substrate can be pretreated within the apparatus before application of the aqueous inkjet ink composition. One or both sides of a substrate can be pretreated, or one side can be pretreated and the opposite surface left untreated.

For example, the substrate can be pretreated to form a "pretreated receiver element" by application of a coating (usually a colorless material), for example as described in U.S. Pat. No. 7,219,989 (Uerz et al.), the disclosure of which is incorporated herein by reference.

Alternatively, a substrate can be pretreated with a pretreatment composition comprising a water-soluble multivalent metal ion salt, such as but not limited to, a salt comprising one or more multivalent cations including calcium, magnesium, barium, zinc, and aluminum cations, with calcium and magnesium cations being particularly useful. Examples of useful multivalent metal cation salts include but are not limited to, calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Other useful salts could be determined by a skilled artisan, and one or more of such multivalent metal cation salts can be used in the pretreatment composition in an amount that would be readily apparent to one skilled in the art.

Such pretreatment compositions can also comprise a cationic polyelectrolyte comprising amidine moieties, and the details of such compounds and their useful amounts are provided in U.S. Pat. No. 8,562,126 (Xiang et al.), the disclosure of which is incorporated herein by reference.

Besides applying with an inkjet printer apparatus (such as a continuous inkjet printer apparatus), the various aqueous inkjet ink compositions described herein can also be applied using other mechanical techniques including but not limited to, rod coating, blade coating, gravure coating, flexographic printing, extrusion hopper coating, curtain coating, and spray coating.

A resulting printed substrate (or printed receiver element) can be any suitable article, including but not limited to, documents, paper currency, postage stamps, various packaging materials, fabrics, polymeric films or sheets, label for clothing, perfume and wine bottles labels, lottery tickets, passports, drivers licenses, and other articles that would be readily apparent to one skilled in the art using the teaching provided herein.

It is also useful that inkjet printed drops of an aqueous inkjet ink compositions be dried on the substrate after they have been inkjet printed.

One sub-system common to most CIJ apparatus and methods and to some of the more recent DOD printing systems, is a recirculating fluid system, which constantly recirculates an aqueous inkjet ink composition either through or behind the nozzles used for jetting the aqueous inkjet ink composition. For the aqueous inkjet ink compositions described above containing pigment colorant particles, the median particle size of such particles and the overall stability of the aqueous dispersion are critical features due to the potentially abrasive nature of the aqueous dispersions. Larger particles or less stable aqueous dispersions are more prone to cause premature wear or failure of the components of the inkjet printing system and fluid sub-system.

In some embodiments, an aqueous inkjet ink composition can be printed by employing a plurality of drop volumes (or drop size) formed from the continuous fluid stream, with non-printing drops of a different volume than printing drops being diverted by a drop deflection means into a gutter for recirculation, as disclosed for example in U.S. Pat. No. 6,588,888 (noted above), U.S. Pat. No. 6,554,410 (Jeanmaire et al.), U.S. Pat. No. 6,682,182 (Jeanmaire et al.), U.S. Pat. No. 6,793,328 (Jeanmaire), U.S. Pat. No. 6,517,197 (Hawkins et al.), U.S. Pat. No. 6,866,370 (Jeanmaire), and U.S. Pat. No. 6,575,566 (Jeanmaire et al.), U.S. Patent Application Publication 2003/0202054 (Jeanmaire et al.) the disclosures of all of which are incorporated herein by reference.

In other embodiments, an aqueous inkjet ink composition can be printed onto at least part of an already applied image on a suitable substrate using an apparatus capable of controlling the direction of the formed printing and non-printing drops by asymmetric application of heat to the continuous stream of the aqueous inkjet ink composition that initializes drop break-up and serves to steer the resultant drops, as disclosed for example in U.S. Pat. No. 6,079,821 (Chwalek et al.) and U.S. Pat. No. 6,505,921 (Chwalek et al.), the disclosures of both of which are herein incorporated by reference. Useful agitation of the aqueous inkjet ink composition, heated main fluid supply, and inkjet print head and composition filtration means for CIJ ink compositions are described for example in U.S. Pat. No. 6,817,705 (Crockett et al.), the disclosure of which is incorporated herein by reference. Printer replenishing systems for maintaining quality of an aqueous inkjet ink composition and to counter the effects of volatile component evaporation are described in U.S. Pat. No. 5,526,026 (Bowers) and U.S. Pat. No. 5,473,350 (Mader et al.), the disclosures of which are incorporated herein by reference, and in EP 0 597 628 A1 (Loyd et al.).

It can be useful to regularly replenish the main fluid supply with the aqueous inkjet ink composition described herein to keep the reservoir at the desired level during inkjet printing. Alternatively, water can be added to the main fluid supply to compensate for evaporation during inkjet printing. A skilled worker in the art would understand how to accomplish these operations using the teaching provided in the art noted above.

The present invention provides at least the following embodiments and combinations thereof, but other combinations of features are considered to be within the present invention as a skilled artisan would appreciate from the teaching of this disclosure:

1. A method of inkjet printing, comprising:
providing a substrate, and
ink jetting an aqueous inkjet ink composition to form a white printed image on the substrate,
wherein the aqueous inkjet ink composition comprises particles of titanium dioxide that are present in an amount of at least 4 weight % and up to and including 15 weight %, and the titanium dioxide particles have a $95^{th}$ percentile particle size of less than 200 nm and a 50th percentile particle size of less than 130 nm, and
the titanium dioxide particles are dispersed within the aqueous inkjet ink composition with a dispersing polymer that is a styrene-(meth)acrylic acid polymer, styrene-maleic anhydride polymer, or styrene-maleic acid polymer, wherein such dispersing polymer comprises at least 25 mol % of styrene recurring units and at least 20 mol % of recurring units derived from (meth)acrylic acid, maleic anhydride or maleic acid, respectively; and the weight ratio of the titanium dioxide particles to the dispersing polymer is from 19:1 to and including 2:1.

2. A method of inkjet printing, comprising:
providing a substrate,
ink jetting an aqueous inkjet ink composition from a main fluid supply as a continuous stream that is broken into both printing drops and non-printing drops, forming a white printed image on the substrate with the printing drops, and
collecting and returning the non-printing drops to the main fluid supply,
wherein:
the aqueous inkjet ink composition comprises particles of titanium dioxide that are present in an amount of at least 4 weight % and up to and including 15 weight %, and the titanium dioxide particles have a $95^{th}$ percentile particle size of less than 200 nm and a $50^{th}$ percentile particle size of less than 130 nm, and
the titanium dioxide particles are dispersed within the aqueous inkjet ink composition with a dispersing polymer that is a styrene-(meth)acrylic acid polymer, styrene-maleic anhydride polymer, or styrene-maleic acid polymer, wherein such dispersing polymer comprises at least 25 mol % of styrene recurring units and at least 20 mol % of recurring units derived from (meth)acrylic acid, maleic anhydride or maleic acid, respectively; and the weight ratio of the titanium dioxide particles to the dispersing polymer is from 19:1 to and including 2:1.

3. The method of embodiment 1 or 2, wherein the weight ratio of the titanium dioxide particles to the dispersing polymer is from 9:1 to and including 5:1.

4. The method of any of embodiments 1 to 3, wherein the dispersing polymer has a weight average molecular weight of at least 5,000 and up to and including 100,000, and an acid value of at least 100 and up to and including 500.

5. The method of any of embodiments 1 to 4, wherein the titanium dioxide particles have a $95^{th}$ percentile particle size of less than 200 nm and a 50th percentile particle size of less than 130 nm.

6. The method of any of embodiments 1 to 5, wherein:
the titanium dioxide particles that have a $95^{th}$ percentile particle size of less than 200 nm and a $50^{th}$ percentile particle size of less than 130 nm;
the dispersing polymer has a weight average molecular weight of at least 5,000 and up to and including 100,000, and an acid value of at least 100 and up to and including 500; and
the weight ratio of the titanium dioxide particles to the dispersing polymer is from 9:1 to and including 5:1.

7. The method of any of embodiments 1 to 6, wherein the aqueous inkjet ink composition further comprises a polyurethane in an amount of at least 0.1 weight % and up to and including 8 weight %, based on the total weight of the aqueous inkjet ink composition. 8. The method of any of embodiments 1 to 7, wherein the polyurethane is a polycarbonate polyurethane that is present in an amount of a least 1 weight % and up to and including 4 weight %, based on the total weight of the aqueous inkjet ink composition.

The following materials were prepared for use in the Examples that are provided to illustrate the practice of this invention and are not meant to be limiting in any manner.
Synthesis of Dispersing Polymer, Poly(styrene-co-methacrylic acid) (59:41 molar ratio):

Styrene (50.0 g, 0.480 mol) and methacrylic acid (28.2 g, 0.328 mol) were placed in a 500 ml flask and tetrahydrofuran (182.0 g) was added for 30% solids. 2,2'-Azobis(2-methylbutyronitrile) (AMBN) (1.56 g, 0.0081 mol) was added and the solution was purged with nitrogen for 60 minutes and placed in a preheated oil bath at 70° C. for 17 hours. The solution was cooled and precipitated into toluene. The precipitate was filtered, dried, re-dissolved in tetrahydrofuran at 25% solids, precipitated into toluene, filtered, and dried to obtain 41.4 g (53% yield) of poly(styrene-co-methacrylic acid).

General Aqueous Dispersion Preparation:

Aqueous dispersions containing titanium dioxide as the sole pigment colorant were prepared according to the present invention using the following materials:
Titanium dioxide (Kronos 1000), 12.5 g;
Dispersing polymer, 1.9 g;
Dimethylethanol amine, 0.6 g; and
Water, 85 g.

In a dispersion vessel, the dispersing polymer and dimethylethanol amine were mixed together to neutralize the dispersing polymer, followed by addition of the titanium dioxide and water. SEPR fused zirconia silica grinding media (250 ml, 0.6-0.8 mm diameter beads) were added to the mixture, the vessel was sealed and placed on a roller mill (about 97 rpm), and the mixture was milled for 13 days to provide an aqueous titanium dioxide dispersion.

Preparation of Aqueous Inkjet Ink Compositions with TiOz as Sole Pigment Colorant:

To prepare aqueous inkjet ink compositions according to the present invention for use in continuous inkjet printing (CU) methods, the following materials were mixed together in a glass jar:
Aqueous TiO2 dispersion (described above), 69 g;
Surfynol® 440 surfactant, 0.06 g;
Glycerol humectant, 4.5 g;
Surfynol'' DF-110L (20% active), 0.08 g; and
Water, 26.4 g.

To prepare aqueous inkjet ink compositions according to the present invention for using in drop on demand printing (DOD) methods, the following materials were mixed together in a glass jar:
Aqueous TiO2 dispersion (described above), 17.25 g;
Surfynol® 465 surfactant, 0.25 g;
Glycerol humectant, 2 g;
Diethylene glycol humectant, 1 g;
1,5-Pentanediol, 1 g; and
Water, 3.5 g.

Each inkjet ink composition was evaluated using coatings onto a substrate. Each inkjet ink composition was coated onto the substrate using a hopper at 0.66 $cm^3/ft^2$ (7.13 $cm^3/m^2$) wet coverage, followed by drying at room temperature.

The substrate used in the evaluations comprised poly (ethylene terephthalate) film samples (0.004 inch or 0.01 cm thickness) that had been coated with poly(vinyl alcohol) (PVA) (GH23 from Nippon Goshei) to provide a dried subbing coating of 50 $mg/ft^2$ (525 $mg/m^2$) of PVA (Substrate A).

Particle Size:

Colorant (titanium dioxide) particle size was measured using a Nanotrac 150 ultrafine particle analyzer available from Microtrac.

Opacity:

The opacity of coatings of aqueous inkjet ink compositions was measured using an X-rite densitometer and calculations as described above.

Potential to Settle:

A sample (2 g) of an aqueous inkjet ink composition was diluted to 20 g with distilled water to provide Dilution A. A sample (1 g) of Dilution A was placed into a 100 ml volumetric flask and further diluted to 100 ml with distilled water. Using a UV-VIS spectrophotometer, the absorbance (Ainitial) was measured at 500 nm. A sample (10 ml) of Dilution A was placed into a 10 ml graduated cylinder, covered with parafilm, and held at room temperature for 1 week, after which 2 ml of the sample was removed from the top of the graduated cylinder using a pipet. A sample (1 g) of this removed dispersion was placed into a 100 ml volumetric flask and diluted to 100 ml with distilled water and the absorbance was then measured at 500 nm ($A_{1\ wk}$). The % residual absorbance was calculated as % Residual Absorbance=$100*A_{1wk}/A_{initial}$ The lower the percentage the greater the potential to settle (less stable aqueous inkjet ink composition).

Incubation Stability:

A sample of the aqueous inkjet ink composition was placed into a sealed vial and incubated at 60° C. for 4 weeks. The particle size of the colorant was measured before and after this incubation period. Any growth in particle size indicates instability of the aqueous inkjet ink composition.

INVENTION EXAMPLE 1

Aqueous Inkjet Ink Composition

An aqueous dispersion was prepared according to the present invention with titanium dioxide using poly(styrene-co-methacrylic acid (59:41 mol ratio) (Dispersant B) as the dispersing polymer at 15 weight % based on the weight of the titanium dioxide.

Two aqueous inkjet ink compositions were prepared using this aqueous dispersion as described above for inkjet printing using DOD or CIJ inkjet printing apparatus. The DOD apparatus was a Kodak 5300 inkjet printer and the inkjet ink composition was successfully inkjet printed onto Substrate A to provide a "white" image with 69% opacity. CIJ inkjet printing was carried out using a CIJ apparatus and the inkjet ink composition was successfully inkjet printed onto Substrate A to provide a "white" image with 55% opacity.

Sample A of the aqueous dispersion containing Dispersant B described above was milled for 13 days and Sample B of the same aqueous dispersion was milled for 4 hours. Inkjet ink compositions were then prepared from these milled samples using the formulation described above, and tested for the "potential to settle" of the titanium dioxide particles using the evaluation described above. The results in the following TABLE I show that when the aqueous dispersion was not sufficiently milled, the titanium dioxide particle size was too large and agglomeration (instability) occurred after 1 week. These results thus show the criticality of having the desired particle size distribution for using titanium dioxide to provide desired dispersibility and the formation of a dry "white" image with desired opacity.

TABLE I

| Aqueous Dispersion | Milling Time | 50% Particle Size (nm) | 95% Particle Size (nm) | Potential to Settle: % residual absorbance |
|---|---|---|---|---|
| Sample A | 13 days | 77 | 115 | 98 |
| Sample B | 4 hours | 227 | 322 | 20 |

COMPARISON EXAMPLE 1 and INVENTIONS EXAMPLES 2-6

Aqueous dispersions and aqueous inkjet ink compositions containing titanium dioxide and samples of polystyrene-acrylic acid) as dispersing polymers were prepared as described above and applied to a substrate, and the evaluation of results are shown in the following TABLES II and III.

These results show that when the appropriate acidic styrene dispersing polymers were used according to the present invention, the titanium dioxide particle size was kept low to provide stability of the aqueous inkjet ink composition and the resulting applied coating showed desired opacity without the use of a substrate that was treated with multivalent metal cations.

TABLE II

| Dispersant | | Ink TiO$_2$ Particles Sizes | | Incubation Stability | | | Potential to |
|---|---|---|---|---|---|---|---|
| Polymer Styrene to Methacrylic Acid Mol Ratio | Example | 50% Percentile (nm) | 95% Percentile (nm) | 50% Percentile (nm) | 95% Percentile (nm) | % Opacity On Substrate A | Settle % Residual Abs |
| 75:25 | Invention 2 | 123 | 176 | 120 | 172 | 50 | 86 |
| 50:50 | Invention 3 | 128 | 191 | 122 | 178 | 60 | 100 |
| 50:50 | Invention 4 | 118 | 172 | 107 | 193 | 72 | 90 |
| 25:75 | Invention 5 | 122 | 187 | 115 | 179 | 73 | 100 |
| 59:41 | Invention 6 | 86 | 130 | 82 | 134 | 55 | 90 |
| E | Comparison 1 | 112 | 204 | NA | NA | 8 | 85 |

NA = not available

Dispersion E was poly(benzyl methacrylate-co-methacrylic acid) (50:50 mol ratio);

TABLE III

| Dispersant | | Ink TiO$_2$ Particles Sizes | | Incubation Stability | | | Potential to |
|---|---|---|---|---|---|---|---|
| Cray Valley Anionic Polymers* | Mol Ratio of Styrene to Methacrylic Acid | 50% Percentile (nm) | 95% Percentile (nm) | 50% Percentile (nm) | 95% Percentile (nm) | % Opacity On Substrate A | Settle % Residual Abs |
| SMA 2000 | 2:1 | 74 | 104 | 116 | 188 | 40 | 84 |
| SMA EF-30 | 3:1 | 73 | 120 | 67 | 101 | 32 | 104 |

TABLE III-continued

| Dispersant | | Ink TiO$_2$ Particles Sizes | | Incubation Stability | | | Potential to |
|---|---|---|---|---|---|---|---|
| Cray Valley Anionic Polymers* | Mol Ratio of Styrene to Methacrylic Acid | 50% Percentile (nm) | 95% Percentile (nm) | 50% Percentile (nm) | 95% Percentile (nm) | % Opacity On Substrate A | Settle % Residual Abs |
| SMA EF-40 | 4:1 | 87 | 137 | 83 | 124 | 52 | 100 |
| SMA EF-60 | 6:1 | 96 | 154 | 98 | 148 | 63 | 82 |

*Cray Valley polymers available from Cray Valley

Aqueous dispersions and aqueous inkjet ink compositions containing various commercial samples of titanium dioxide and a poly(styrene-methacrylic acid) (59:41 mol ratio) as a dispersing polymer were prepared as described above and coated onto Substrate A, and the evaluation of results are shown in the following TABLE IV.

These results show that when the appropriate acidic styrene dispersing polymers were used as dispersing polymers according to the present invention, the size of particles from various types of titanium dioxide were kept low to provide stability of the aqueous inkjet ink compositions. The resulting coatings exhibited desired opacity without the use of a substrate that has been treated with multivalent metal cations. The results also show that different pigment colorant to dispersing polymer ratios provide aqueous dispersions that are stable in the aqueous inkjet ink compositions and provide the desired opacity when dried on the substrate.

polycarbonate dial) or a polycarbonate-polyurethane (PCPU, made from isophorone, bishydroxymethylpropionic acid, butanediol, and a polytetramethylene glycol). Each aqueous inkjet ink composition was applied to Substrate A and the evaluation of results are shown in the following TABLE V.

These results show that the incorporation of a polyurethane with the poly(styrene-acrylic acid) dispersing polymer provided stable aqueous inkjet ink compositions and improved opacity without the use of a substrate that has been treated with multivalent metal cations.

TABLE IV

| Titanium Dioxide | Type (Supplier) | TiO$_2$ to Dispersing Polymer Ratio | Ink TiO$_2$ Particles Sizes | | Incubation Stability | | | Potential to Settle |
|---|---|---|---|---|---|---|---|---|
| | | | 50% Percentile (nm) | 95% Percentile (nm) | 50% Percentile (nm) | 95% Percentile (nm) | % Opacity On Substrate A | % Residual Abs |
| Kronos 1000 | Anatase (Kronos) | 6.6:1 | 82 | 109 | 71 | 105 | 45 | 107 |
| TiPure R104 | Rutile (DuPont) | 6.6:1 | 110 | 177 | 104 | 186 | 75 | 87 |
| Kronos 2310 | Rutile (Kronos) | 6.6:1 | 84 | 138 | 67 | 101 | 48 | 97 |
| Kronos 1000 | Anatase (Kronos) | 13.3:1 | 86 | 144 | 86 | 122 | 41 | 98 |
| Kronos 1000 | Anatase (Kronos) | 10:1 | 69 | 106 | 61 | 92 | 45 | 100 |

INVENTION EXAMPLE 7

Aqueous dispersions and aqueous inkjet ink compositions containing titanium dioxide and samples of poly(styrene-acrylic acid) as dispersing polymers were prepared as described above for the CU printing method. To these were added at 2 weight % with respect to the aqueous inkjet ink composition, either a polyether-polyurethane (PEPU, made from isophorone, bishydroxymethylpropionic acid, and a

TABLE V

| Dispersant Polymer:Styrene to Methacrylic Acid Mol Ratio | Polyurethane | Ink TiO$_2$ Particles Sizes | | Incubation Stability | | | Potential to Settle |
|---|---|---|---|---|---|---|---|
| | | 50% Percentile (nm) | 95% Percentile (nm) | 50% Percentile (nm) | 95% Percentile (nm) | % Opacity On Substrate A | % Residual Abs |
| 59:41 | None | 79 | 118 | 72 | 98 | 56 | 100 |
| 59:41 | 2% PEPU | 83 | 118 | NA | NA | 67 | 98 |
| 59:41 | 2% PCPU | 79 | 118 | 89 | 120 | 74 | 100 |

NA = not available

The invention has been described in detail with particular reference to certain preferred embodiments thereof, but it will be understood that variations and modifications can be effected within the spirit and scope of the invention.

The invention claimed is:

1. A method of inkjet printing, comprising:
providing a substrate, and
ink jetting an aqueous inkjet ink composition to form a white printed image on the substrate, the white printed image having an opacity of at least 30%,
wherein the aqueous inkjet ink composition comprises particles of titanium dioxide that are present in an amount of at least 4 weight % and up to and including 15 weight %, and the titanium dioxide particles have a $95^{th}$ percentile particle size of less than 200 nm and a $50^{th}$ percentile particle size of less than 130 nm, and
the titanium dioxide particles are dispersed within the aqueous inkjet ink composition with a dispersing polymer that is a styrene-(meth)acrylic acid polymer, styrene-maleic anhydride polymer, or styrene-maleic acid polymer, wherein such dispersing polymer comprises at least 25 mol % of styrene recurring units and at least 20 mol % of recurring units derived from (meth)acrylic acid, maleic anhydride or maleic acid, respectively; and the weight ratio of the titanium dioxide particles to the dispersing polymer is from 19:1 to and including 2:1.

2. The method of claim 1, wherein the weight ratio of the titanium dioxide particles to the dispersing polymer is from 9:1 to and including 5:1.

3. The method of claim 1, wherein the dispersing polymer has a weight average molecular weight of at least 5,000 and up to and including 100,000, and an acid value of at least 100 and up to and including 500.

4. The method of claim 1, wherein the titanium dioxide particles have a $95^{th}$ percentile particle size of less than 200 nm and a $50^{th}$ percentile particle size of less than 130 nm.

5. The method of claim 1, wherein:
the titanium dioxide particles that have a $95^{th}$ percentile particle size of less than 200 nm and a $50^{th}$ percentile particle size of less than 130 nm;
the dispersing polymer has a weight average molecular weight of at least 5,000 and up to and including 100,000, and an acid value of at least 100 and up to and including 500; and
the weight ratio of the titanium dioxide particles to the dispersing polymer is from 9:1 to and including 5:1.

6. The method of claim 1, wherein the aqueous inkjet ink composition further comprises a polyurethane in an amount of at least 0.1 weight % and up to and including 8 weight %, based on the total weight of the aqueous inkjet ink composition.

7. The method of claim 6, wherein the polyurethane is a polycarbonate polyurethane that is present in an amount of a least 1 weight % and up to and including 4 weight %, based on the total weight of the aqueous inkjet ink composition.

8. A method of inkjet printing, comprising:
providing a substrate,
ink jetting an aqueous inkjet ink composition from a main fluid supply as a continuous stream that is broken into both printing drops and non-printing drops, forming a white printed image on the substrate with the printing drops, the white printed image having an opacity of at least 30%, and
collecting and returning the non-printing drops to the main fluid supply,
wherein:
the aqueous inkjet ink composition comprises particles of titanium dioxide that are present in an amount of at least 4 weight % and up to and including 15 weight %, and the titanium dioxide particles have a $95^{th}$ percentile particle size of less than 200 nm and a $50^{th}$ percentile particle size of less than 130 nm, and
the titanium dioxide particles are dispersed within the aqueous inkjet ink composition with a dispersing polymer that is a styrene-(meth)acrylic acid polymer, styrene-maleic anhydride polymer, or styrene-maleic acid polymer, wherein such dispersing polymer comprises at least 25 mol % of styrene recurring units and at least 20 mol % of recurring units derived from (meth)acrylic acid, maleic anhydride or maleic acid, respectively; and theweight ratio of the titanium dioxide particles to the dispersing polymer is from 19:1 to and including 2:1.

9. The method of claim 8, wherein the weight ratio of the titanium dioxide particles to the dispersing polymer is from 9:1 to and including 5:1.

10. The method of claim 8, wherein the dispersing polymer has a weight average molecular weight of at least 5,000 and up to and including 100,000, and an acid value of at least 100 and up to and including 500.

11. The method of claim 8, wherein the titanium dioxide particles have a $95^{th}$ percentile particle size of less than 200 nm and a $50^{th}$ percentile particle size of less than 130 nm.

12. The method of claim 8, wherein:
the titanium dioxide particles that have a $95^{th}$ percentile particle size of less than 200 nm and a $50^{th}$ percentile particle size of less than 130 nm;
the dispersing polymer has a weight average molecular weight of at least 5,000 and up to and including 100,000, and an acid value of at least 100 and up to and including 500; and
the weight ratio of the titanium dioxide particles to the dispersing polymer is from 9:1 to and including 5:1.

13. The method of claim 8, wherein the aqueous inkjet ink composition further comprises a polyurethane in an amount of at least 0.1 weight % and up to and including 8 weight %, based on the total weight of the aqueous inkjet ink composition.

14. The method of claim 13, wherein the polyurethane is a polycarbonate polyurethane that is present in an amount of a least 1 weight % and up to and including 4 weight %, based on the total weight of the aqueous inkjet ink composition.

* * * * *